(12) United States Patent
Hosoya et al.

(10) Patent No.: US 6,474,652 B1
(45) Date of Patent: Nov. 5, 2002

(54) SHAFT SEAL DEVICE

(75) Inventors: Masachi Hosoya; Kazuaki Konishi; Toshikazu Yabe, all of Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/419,569

(22) Filed: Oct. 18, 1999

(30) Foreign Application Priority Data

Oct. 20, 1998 (JP) .............................................. 10-298105

(51) Int. Cl.[7] .................................................. F16J 15/34
(52) U.S. Cl. ........................ 277/358; 277/361; 277/375; 277/399
(58) Field of Search ................................. 277/361, 362, 277/375, 399, 579, 580, 582, 370, 374; 384/462, 463, 484, 486, 467, 480, 477, 476

(56) References Cited

U.S. PATENT DOCUMENTS

| 2,912,264 A | * | 11/1959 | Peck ............................. 286/7 |
| 2,983,529 A | * | 5/1961 | Price ............................. 286/5 |
| 3,971,565 A | * | 7/1976 | Schickling ................... 277/59 |
| 5,655,845 A | * | 8/1997 | Lampart ...................... 384/480 |
| 5,697,710 A | * | 12/1997 | Iida ............................ 384/473 |
| 6,004,039 A | | 12/1999 | Yabe et al. |
| 6,119,813 A | * | 9/2000 | Yabe et al. .................... 184/5 |
| 6,296,393 B1 | * | 10/2001 | Yabe et al. ................. 384/463 |

FOREIGN PATENT DOCUMENTS

| JP | 6-32837 | 4/1994 |
| JP | 9-14452 A | 1/1997 |

* cited by examiner

*Primary Examiner*—Robert J. Sandy
*Assistant Examiner*—Matthew E. Rodgers
(74) *Attorney, Agent, or Firm*—Frishauf, Holtz, Goodman & Chick, P.C.

(57) ABSTRACT

A shaft seal device is provided which is capable of sealing a rotary shaft in a positive and reliable manner without requiring a periodical lubricant-supplying operation, and is free from contamination of its environment, products, etc. by splashing of excess lubricant leaking from the oil seal lip. An annular sealing channel is formed in at least one of the opposite ends of a housing of a bearing unit, in which is accommodated an annular lubricant-bearing polymer member fitted on the rotary shaft. The polymer member has an inside diameter substantially equal to an outer diameter of the rotary shaft at an initial stage of rotation of the rotary shaft. The polymer member has at least part of opposite end surfaces or outer peripheral portion thereof disposed substantially in contact with opposite lateral wall surfaces of the sealing channel.

2 Claims, 12 Drawing Sheets

SHAFT SEAL DEVICE

BACKGROUND OF THE INVENTION

1. Field of the Invention

The present invention relates to a shaft seal device, and more particularly to a shaft seal device for use in a bearing unit such as a plummer block used in iron and steel equipment and the like.

2. Prior Art

A conventional shaft seal device of a bearing unit used in iron and steel equipment and the like, such as an oil seal, requires applying lubricant to sliding parts (lips) thereof. To this end, in steel works, usually an operation of supplying lubricant to lips of oil seals is periodically carried out, which costs time and labor. Further, the conventional shaft seal device has a problem that excess lubricant leaking from lips of oil seals splashes with rotation of the rotary shaft to contaminate or stain its environment, rolled plates produced, etc. To solve this problem, a shaft seal device as shown in FIG. 13 has been proposed by Japanese Laid-Open Utility Model Publication (Kokai) No. 6-32837.

The proposed shaft seal device 101 is comprised of a pair of core metal members 102 and 103 with fitting collars 109 and 110 integrally fitted one upon another, and seal members 104 and 105 mounted on inner peripheral edges of main bodies 107 and 108 of the core metal members 102, 103. The seal members 104, 105 have flexible lips which are suitably deflected and urged against an outer peripheral surface of a rotary shaft 111 to be sealed, in operation. A clip 115 is fitted on an outer peripheral surface of the lip of the seal member 105 so as to obtain a sufficient urging force of the lip. A lubricant-bearing polymer which is so-called "plastic grease" 106" is filled in a gap between the opposed main bodies 107, 108 of the core metal members 102, 103.

Lubricant continuously exudes or oozes from the lubricant-bearing polymer contained in the oil seal is led to the lips of the seal members 104, 105 to lubricate the same. This can dispense with the periodical operation of supplying lubricant to the lips. Besides, the amount of lubricant exuding from the polymer is so small as to solve the above-mentioned problem of environmental contamination.

According to the conventional arrangement, however, since the exudation amount of lubricant is very small, a sufficient amount of lubricant cannot reach the lips of the seal members 104, 105. Further, even if the exudation amount of lubricant is sufficient, the lubricant flows along the inner peripheral portion of the lubricant-bearing polymer and stays at the lowermost inner peripheral portion of the polymer but does not reach the lips.

SUMMARY OF THE INVENTION

It is therefore an object of the present invention to provide a shaft seal device which is capable of sealing a rotary shaft in a positive and reliable manner without requiring a periodical lubricant-supplying operation, and is free from contamination of its environment, products, etc. by splashing of excess lubricant leaking from the oil seal lip.

To attain the above object, the present invention provides a shaft seal device for a bearing unit having a bearing fitted on a rotary shaft, and a housing accommodating the rotary shaft extending therethrough, the housing having opposite ends, comprising:

an annular sealing channel formed in at least one of the opposite ends of the housing, the annular sealing channel having opposite lateral wall surfaces; and an annular lubricant-bearing polymer member accommodated in the annular sealing channel and fitted on the rotary shaft, the polymer member having opposite end surfaces, and an outer peripheral portion;

wherein the polymer member has an inside diameter substantially equal to an outer diameter of the rotary shaft at an initial stage of rotation of the rotary shaft; and wherein at least part of the opposite end surfaces or the outer peripheral portion of the polymer member is disposed substantially in contact with the opposite lateral wall surfaces of the annular sealing channel.

With the above arrangement, at an initial stage of rotation of the rotary shaft, the inside diameter of the annular lubricant-bearing polymer member is substantially equal to the outer diameter of the rotary shaft so that the polymer member closely contacts the rotary shaft at its inner peripheral surface or is rotated by the rotating rotary shaft while sliding thereon, while at the same time at least part of the opposite end surfaces or the outer peripheral portion of the polymer member substantially contacts the opposite lateral wall surfaces of the sealing channel. As a result, the surfaces of the polymer member in contact with its counterpart function as sealing surfaces to prevent dust and splashed water droplets from entering the bearing unit from the outside of the housing.

The lubricant-bearing polymer member has a function of exuding lubricant from its surfaces and has a nature that its inside diameter and outside diameter become reduced depending upon the exudation amount of lubricant. Therefore, when the inside diameter of the polymer member which initially closely contacts the rotary shaft or slides thereon becomes smaller than the outside diameter of the rotary shaft with exudation of the lubricant from the polymer member as the rotation of the rotary shaft continues, the polymer member becomes tightly fitted on the rotary shaft, whereby the former rotates together with the latter. Thereafter, the rotation of the polymer member is maintained with at least part of the opposite end surfaces or the outer peripheral portion of the polymer member in sliding contact with the opposite lateral wall surfaces of the sealing channel, or the polymer member rotates with delay relative to the rotation of the rotary shaft due to the sliding resistance of the sliding surfaces between the polymer member and the sealing channel. As a result, the surfaces of the polymer member in contact with its counterpart function as sealing surfaces to prevent dust and splashed water droplets from entering the bearing unit from the outside of the housing, as is the case with the initial stage of rotation of the rotary shaft.

In other words, the shaft seal device assumes an initial state in which the inside diameter of the lubricant-bearing polymer member is substantially equal to the outside diameter of the rotary shaft, and a state in which the inside diameter of the polymer member is smaller than the outside diameter of the rotary shaft such that the polymer member is tightly fitted on the rotary shaft. Between the two states, however, no change occurs in the position of the sealing surfaces, though the state of the sealing surfaces changes, and in the both states, it is possible to dust and splashed water droplets from entering the bearing unit.

Further, since the lubricant continuously exudes from the sliding surfaces of the lubricant-bearing polymer member to well lubricate the sliding surfaces, which prevents wear of the polymer member due to the friction between the polymer member and its counterpart as well as formation of a gap between the two members, whereby dust and splashed water droplets can be prevented from entering the bearing unit.

The lubricant can exude from the polymer member over a long time, making it unnecessary to periodically supply lubricant. Besides, the exudation amount of lubricant is very small but equal to the minimum amount required for lubrication such that the exuded lubricant will not be splashed with rotation of the rotary shaft, and therefore the environment and the products cannot be contaminated by the lubricant.

Preferably, the shaft seal device according to the present invention includes an annular covering member formed of an elastic material with an inner peripheral channel formed therein. The annular covering member is fitted in the annular sealing channel in an elastically compressed fashion, and the lubricant-bearing polymer member is accommodated in the inner peripheral channel of the covering member. With this arrangement, the lubricant-bearing polymer member will not directly slide on the associated end portion of the housing but slides on the covering member. As a result, the possibility of wearing of the polymer member is reduced.

Preferred forms of the present invention are as follows:

1. At least one of the opposite lateral wall surfaces of the annular sealing channel is tapered, and at least one of opposite outer end surfaces of the covering member is tapered according to the tapered at least one of the opposite lateral walls of the sealing channel.

2. The covering member has opposite inner end surfaces, at least one of which is roughened.

3. The covering member has opposite end walls, at least one of which has at least one through hole formed therein.

4. The opposite end surfaces of the lubricant-bearing polymer member are spaced from respective associated ones of the opposite inner end surfaces of the covering member with a gap formed therebetween, the gap extending along one of the opposite end surfaces of the polymer member, an outer peripheral surface thereof, and the other end surface thereof so as to present a form of a labyrinth, and lubricant exuding from the polymer member is filled in the gap.

5. A plurality of circumferentially extending protuberances are formed on at least one of the opposite end surfaces of the lubricant-bearing polymer member and the opposite inner end surfaces of the covering member.

6. The outer peripheral portion of the lubricant-bearing polymer member is formed therein with a plurality of circumferentially extending grooves, while an inner peripheral surface of the covering member has formed thereon a plurality of circumferentially extending protuberances at locations corresponding respectively to the circumferentially extending grooves of the lubricant-bearing polymer member, the protuberances being inserted in respective associates ones of the circumferentially extending grooves. In this case, more preferably, the opposite end surfaces of the lubricant-bearing polymer member are spaced from the opposite inner end surfaces of the covering member so as to present a gap in the form of a labyrinth between the two members.

7. An inner peripheral portion of the lubricant-bearing polymer member has formed thereon at least one lip disposed for sliding contact with the rotary shaft, a part of the inner peripheral portion other than a part thereof formed with the at least one lip has an inside diameter larger than the outside diameter of the rotary shaft.

8. At least one of the outer peripheral portion of the lubricant-bearing polymer member and an inner peripheral portion of the covering member has at least one lip formed thereon, the at least one lip being disposed in elastic contact with an inner peripheral surface of the covering member or the outer peripheral surface of the polymer member. In this case, more preferably, the at least one lip is formed on the outer peripheral portion of the lubricant-bearing polymer member and projects from an associated one of the opposite end surfaces of the polymer member in a longitudinal direction of the rotary shaft. Alternatively, the at least one lip entirely may lie in the range of the thickness of the polymer member such that the end surfaces of the polymer member and the inner end surfaces of the covering member are in contact with each other.

9. At least one of at least one of the opposite end surfaces of the lubricant-bearing polymer member and at least one of opposite inner end surfaces of the covering member has at least one lip formed thereon, the at least one lip being each disposed in elastic contact with an associated one of the opposite end surfaces of the polymer member or an associated one of the opposite inner end surfaces of the covering member.

10. The outer peripheral portion of the lubricant-bearing polymer member has a plurality of circumferentially extending grooves formed therein, while an inner peripheral surface of the covering member has formed thereon a plurality of circumferentially extending protuberances at locations corresponding respectively to the circumferentially extending grooves of the lubricant-bearing polymer member, the protuberances being inserted in respective associates ones of the circumferentially extending grooves, and further, at least one of at least one of the opposite end surfaces of the lubricant-bearing polymer member and at least one of opposite inner end surfaces of the covering member has at least one lip formed thereon, the at least one lip being each disposed in elastic contact with an associated one of the opposite end surfaces of the polymer member or an associated one of the opposite inner end surfaces of the covering member.

11. The outer peripheral portion of the covering member has a circumferentially extending outer peripheral groove formed therein, the covering member having formed therein a plurality of through holes for supply of lubricant circumferentially arranged and extending from the outer peripheral groove to the inner peripheral surface of the covering member, and the housing of the bearing unit has formed therein a port for supply of lubricant upwardly extending from an uppermost position of the outer peripheral groove.

A description will be made of the chemical composition of a lubricant-bearing polymer that forms the lubricant-bearing polymer member used in the bearing unit employing the shaft seal device according to the present invention hereinbelow.

The lubricant-bearing polymer consists essentially of a polyolefine resin, and a lubricant such as a paraffin mineral oil and grease. The polymer may be produced by heating a raw material prepared from a mixture of the polyolefine resin and the lubricant to a temperature above its melting point into a plastic state, and then cooling the same into a solid state. Alternatively, the lubricant-bearing polymer may be polyurethane rubber which has been hardened with grease contained therein, or may be produced from a material consisting essentially of a polyester elastomer resin, and a lubricant such as ester oil and ester oil-base grease by heating a raw material prepared from a mixture of the polyester elastomer resin and the lubricant to a temperature above its melting point into a plastic state, and then cooling the same into a solid state. The possible chemical composition of the polymer is 10–50 weight % the resin or the rubber, and 90–50 weight % the lubricant. Since the strength required for the polymer member to serve as a structural member is lower as the content of the resin or the rubber is lower, the preferable chemical composition is 20–50 weight % the resin or the rubber, and 80–50 weight % the lubricant. As the lubricant, other materials such as paraffin hydrocarbon oil, naphthene hydrocarbon oil, mineral oil, ether oil, and ester oil may be used.

The above and other objects, feature, and advantages of the invention will become more apparent from the following detailed description taken in conjunction with the accompanying drawings.

DETAILED DESCRIPTION OF PREFERRED EMBODIMENTS

Figure 1:
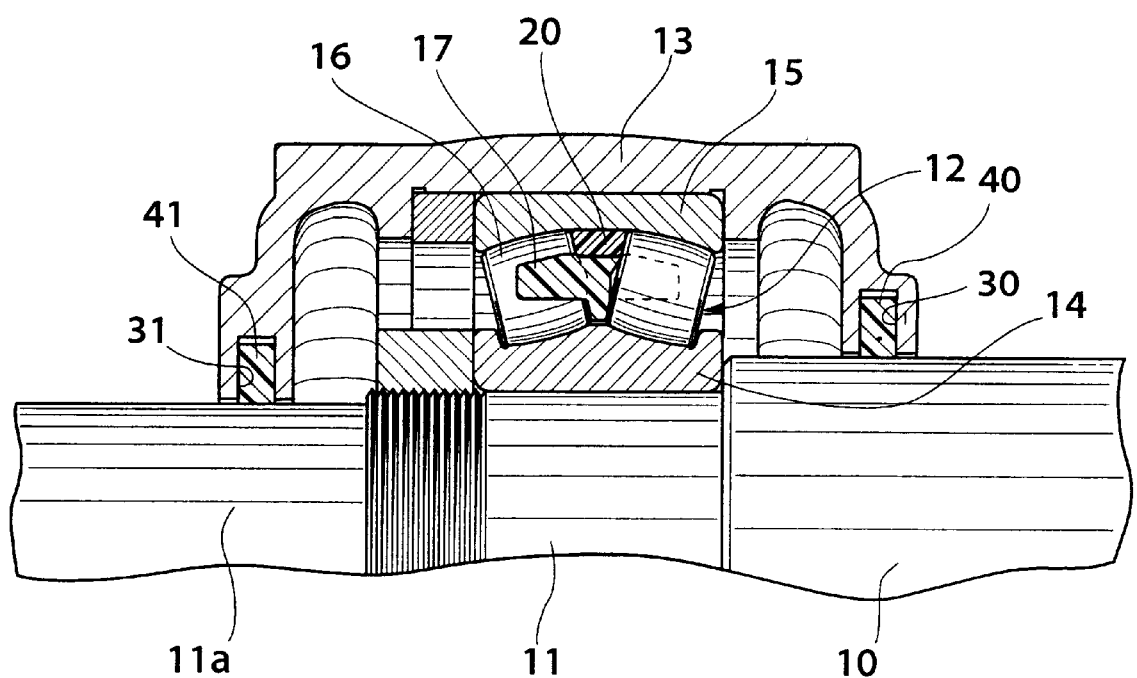
FIG. 1 is a fragmentary axial sectional view showing the construction of a bearing unit employing a shaft seal device according to a first embodiment of the present invention.

The present invention will now be described in detail with reference to the accompanying drawings showing preferred embodiments thereof. In drawings showing all embodiments of the present invention and variations thereof, corresponding elements and parts are designated by identical reference numerals.

Referring first to FIG. 1, there is shown the construction of a bearing unit employing a shaft seal device according to a first embodiment of the present invention. The illustrated bearing unit is a plummer block.

In FIG. 1, reference numeral 10 designates a rotary shaft which has thinned portions 11 and 11a at an end portion thereof. A self-aligning rolling bearing 12 is mounted on the thinned portion 11. The bearing 12 is accommodated in a housing 13, and is mainly comprised of an inner ring 14 fitted on the thinned portion 11, an outer ring 15 fitted in an inner peripheral portion of the housing 13, double-train rollers 16 disposed to roll along track grooves formed in the outer peripheral surface of the inner ring 14 and the inner peripheral surface of the outer ring 15, and a solid cage that retains the rollers 16.

A lubricant-bearing polymer member 20 in the form of a ring or annulus is fitted in a space defined between the track grooves in a fashion urgingly contacting the inner peripheral surface of the outer ring 15. The lubricant-bearing polymer member 20 has opposite end surfaces thereof disposed in contact with the rollers 16 so as to guide the rollers 16 along a track surface of the outer ring 15.

An annular sealing channel 30 is formed in one axial end of the housing 13, in which is accommodated a lubricant-bearing polymer member 40 in the form of a ring or annulus. The polymer member 40 is fitted on the rotary shaft 10, to seal between the axial end of the housing 13 and the rotary shaft 10. At an initial stage of rotation of the rotary shaft 10, the lubricant-bearing polymer member 40 has an inside diameter almost equal to the outside diameter of the rotary shaft 10. On this occasion, at least one end surface of the polymer member 40 is in contact with at least one associated lateral wall surface of the sealing channel 30. The polymer member 40 also functions to prevent dust and water droplets from entering the bearing unit from the outside of the housing 13.

Similarly, an annular sealing channel 31 is formed in the other axial end of the housing 13, in which is accommodated a lubricant-bearing polymer member 41 having the same construction and function as the polymer member 40 and fitted on the rotary shaft 10, to seal between the other axial end of the housing 13 and the rotary shaft 10. At least one end surface of the polymer member 41 is in contact with at least one associated lateral wall surface of the sealing groove 31.

The chemical composition of a lubricant-bearing polymer forming the lubricant-bearing polymer member 20 is 5 weight % ultrahigh molecular weight (UHMW) polyethylene (that belongs to UHMW), 20 weight % high density polyethylene (that belongs to relatively low molecular weight), 5 weight % polyethylene wax (that belongs to wax), and 70 weight % paraffin mineral oil.

The chemical composition of a lubricant-bearing polymer forming the lubricant-bearing polymer members 40, 41 is 10 weight % ultrahigh molecular weight (UHMW) polyethylene (that belongs to UHMW), 20 weight % high density polyethylene (that belongs to relatively low molecular weight), and 70 weight % paraffin mineral oil.

The shaft seal device according to the first embodiment is constituted by the sealing channel 30 and the lubricant-bearing polymer member 40 and the sealing channel 31 and the lubricant-bearing polymer member 41.

The operation of the shaft seal device according to the present embodiment constructed as above will now be described with respect to the sealing channel 30 and the lubricant-bearing polymer member 40 provided at the one axial end of the housing 13.

At an initial stage of rotation of the rotary shaft 10, the inside diameter of the lubricant-bearing polymer member 40 is almost equal to the outside diameter of the rotary shaft 10, and then the polymer member 40 and the rotary shaft 10 slide against each other such that the polymer member 40 is stationary or rotated by the rotation of the rotary shaft 10. If the polymer member 40 is stationary, at least one end surface thereof is in stationary close contact with at least one corresponding lateral wall surface of the sealing channel 13 which is stationary, while if the polymer member 40 is rotated by the rotation of the rotary shaft 10, the at least one end surface of the polymer member 40 and the at least one corresponding lateral wall surface of the sealing channel 13 slide against each other.

Irrespective of whether the polymer member 40 is stationary or it is rotated by the rotating rotary shaft 10, the at least one surface of the polymer member 40 that is in contact with its counterpart functions as a sealing surface to prevent dust and splashed water droplets from entering the bearing unit from the outside of the housing 13. Thereafter, as the lubricant exudes from the lubricant-bearing polymer member 40 with further rotation of the rotary shaft 10, the inside diameter and outside diameter of the polymer member 40 become reduced depending upon the exudation amount of lubricant, so that the inside diameter of the polymer member 40 becomes smaller than the outside diameter of the rotary shaft 10, and accordingly the polymer member 40 becomes tightly fitted on the rotary shaft 10.

In this state, the polymer member 40 rotates together with the rotary shaft 10, or it rotates with delay relative to the rotation of the rotary shaft 10 due to the sliding resistance of the sliding surfaces between the polymer member 40 and the sealing channel 30. When the polymer member 40 rotates together with the rotary shaft 10, they are in stationary close contact with each other, and on the other hand, when the polymer member 40 rotates with delay relative to the rotation of the rotary shaft 10, they slide against each other. In either case, the at least one end surface of the polymer member 40 and the at least one corresponding lateral wall surface of the sealing channel 30 always slide against each other. Thus, when the polymer member 40 is reduced in size after continued rotation of the rotary shaft 10, the at least one surface of the polymer member 40 that is in contact with its counterpart functions as a sealing surface to prevent dust and splashed water droplets from entering the bearing unit from the outside of the housing 13, as is the case with the initial stage of rotation of the rotary shaft 10.

The lubricant continuously exudes from the sliding surface of the lubricant-bearing polymer member 40 to well lubricate the sliding surface of the member 50 with its counterpart. Therefore, the sliding friction between the the polymer member 40 and its counterpart is so small that the polymer member 40 is not worn by its sliding against the counterpart, and hence no gap cannot be formed between the sliding surfaces of the two members, whereby entry of alien substances such as dust and water droplets into the bearing unit can be prevented.

The operation of the shaft seal device at the other axial end of the housing 13 is identical or similar to the operation described as above.

Second to twelfth embodiments of the present invention will now be described. In FIGS. 2A to 12B showing these embodiments, only shaft seal devices at the one axial end of the housing 13 are shown, and shaft seal devices at the other axial end of the housing 13 are similarly constructed, illustration and description of which are therefore omitted.

Figure 2A:
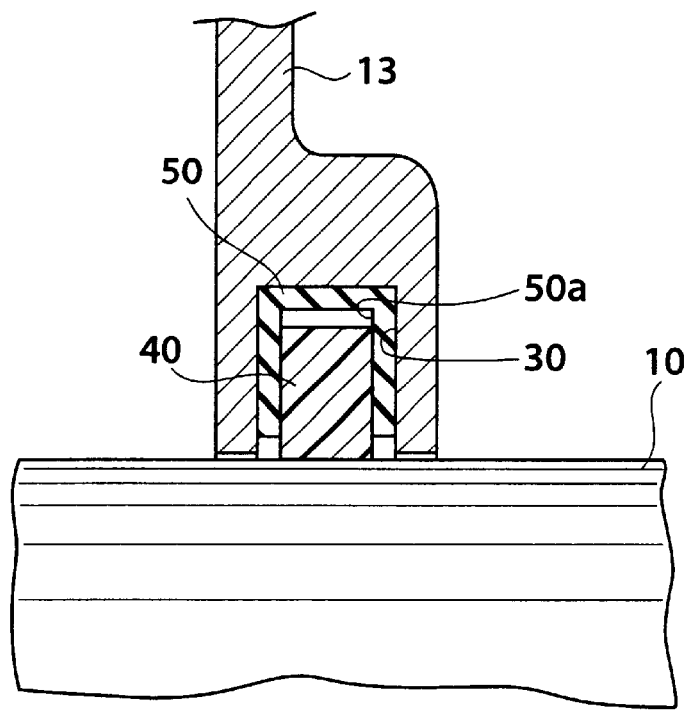
FIG. 2A is a fragmentary axial sectional view showing the construction of a shaft seal device according to a second embodiment of the invention.

A second embodiment of the present invention will now be described with reference to FIG. 2A showing an axial section of a shaft seal device according to the second embodiment.

The shaft seal device according to the present embodiment is mounted in the bearing unit as shown in FIG. 1, and description of the construction, operation and effects thereof which are common or identical to those of the first embodiment described above is omitted.

Fitted in the annular sealing channel 30 formed in the axial end of the housing 13 is a covering member 50 in the form of an annulus, which is formed of an elastic material such as rubber and has a U-shaped axial section. The covering member 50 has an inner peripheral channel 50a formed therein, in which is accommodated the lubricant-bearing polymer member 40 in the form of a ring or annulus, which is fitted on the rotary shaft 10, to seal between the axial end of the housing 13 and the rotary shaft 10. At an initial stage of rotation of the rotary shaft 10, the lubricant-bearing polymer member 40 has an inside diameter almost equal to the outside diameter of the rotary shaft 10. On this occasion, at least one end surface of the polymer member 40 is in contact with at least one associated lateral wall surface of the sealing groove 30.

Next, the operation of the present embodiment will be described. With the above arrangement, the polymer member 40 and the rotary shaft 10 slide against each other such that at least one end surface of the polymer member 40 is in stationary close contact with at least one corresponding inner end surface of the covering member 50 or slides against the latter. With further rotation of the rotary shaft 10, the lubricant exudes from the lubricant-bearing polymer member 40 so that the inside diameter of the polymer member 40 becomes smaller than the outside diameter of the rotary shaft 10, and accordingly the polymer member 40 becomes tightly fitted on the rotary shaft 10. On this occasion, the polymer member 40 and the rotary shaft 10 rotate together with each other, or they slide against each other such that at least one end surface of the polymer member 40 slides against at least one corresponding inner end surface of the covering member 50.

Depending upon whether the rotation of the rotary shaft 10 is in an initial state or in a continued state, the shaft seal device assumes either of the above-mentioned two states. In either case, the at least one surface of the polymer member 40 that is in contact with its counterpart functions as a sealing surface to prevent dust and splashed water droplets from entering the bearing unit from the outside of the housing 13.

While in the first embodiment, if the housing 13 is formed of a metal material, there is a possibility that the lubricant-bearing polymer member 40 is worn down at its sliding surface with the axial end of the housing 13, in the second embodiment, however, the intervention of the covering member 50 formed of an elastic material such as rubber between the axial end of the housing 13 and the polymer member 40 makes it possible to prevent the polymer member 40 from directly sliding against the axial end of the housing 13. Since the polymer member 40 slides against the covering member 50 which is formed of an elastic material, the amount of wear of the polymer member 40 is greatly reduced. Also in this embodiment, the lubricant continuously exudes from the sliding surfaces of the polymer member 40 that are in sliding contact with the covering member 50 to lubricate the sliding surfaces of the two members, to thereby prevent formation of gaps between the two members due to wear of them, and hence prevent degradation of the sealing performance. The covering member 50 is fitted in the sealing channel 30 at the axial end of the housing 13 in an elastically compressed fashion, and therefore it will not be rotated in the housing 13 even if it receives torque from the polymer member 40 in sliding contact with the covering member 50.

Figure 2B:
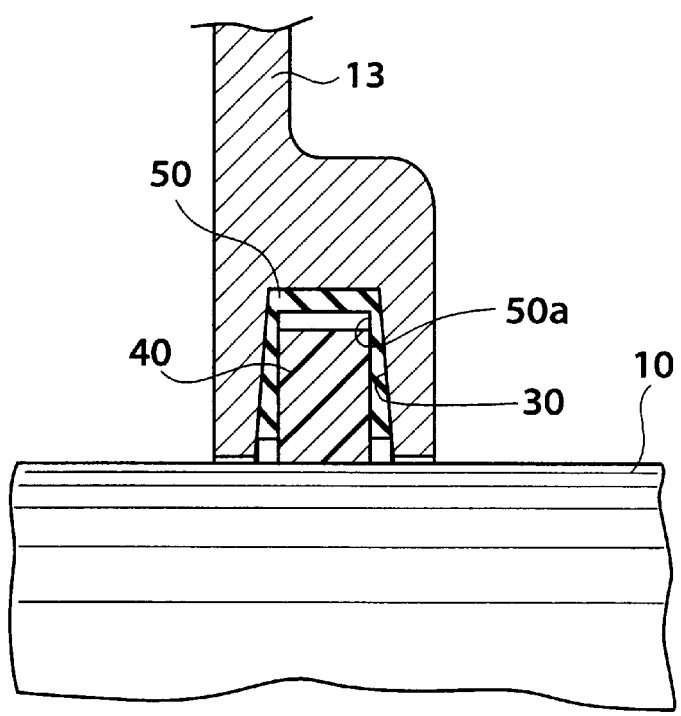
FIG. 2B is a similar view to FIG. 2A showing the construction of a variation of the second embodiment.

FIG. 2B shows the construction of a variation of the second embodiment. This variation is distinguished from the second embodiment described above in that the sealing channel 30 formed in the housing 13 has a trapezoidal section with its opposite lateral wall surfaces tapered, and the covering member 50 has its opposite outer end surfaces tapered correspondingly to the taped opposite lateral wall surfaces of the sealing channel 30. This construction can prevent gaps from being formed between the lubricant-bearing polymer member 40 and the opposite lateral wall surfaces of the sealing channel 30 due to reduction of the outside and inside diameters of the polymer member 40, to thereby exhibit a further reliable sealing performance.

The material of the covering member 50 may include elastomers, in addition to rubber.

Shaft seal devices according to the third to twelfth embodiments which will be described hereinbelow are all mounted in the bearing unit as shown in FIG. 1 and have substantially the same construction with that of the second embodiment described above. Description of the construction, operation, and effects thereof which are common or identical to those of the second embodiment described above is omitted.

Figure 3A:
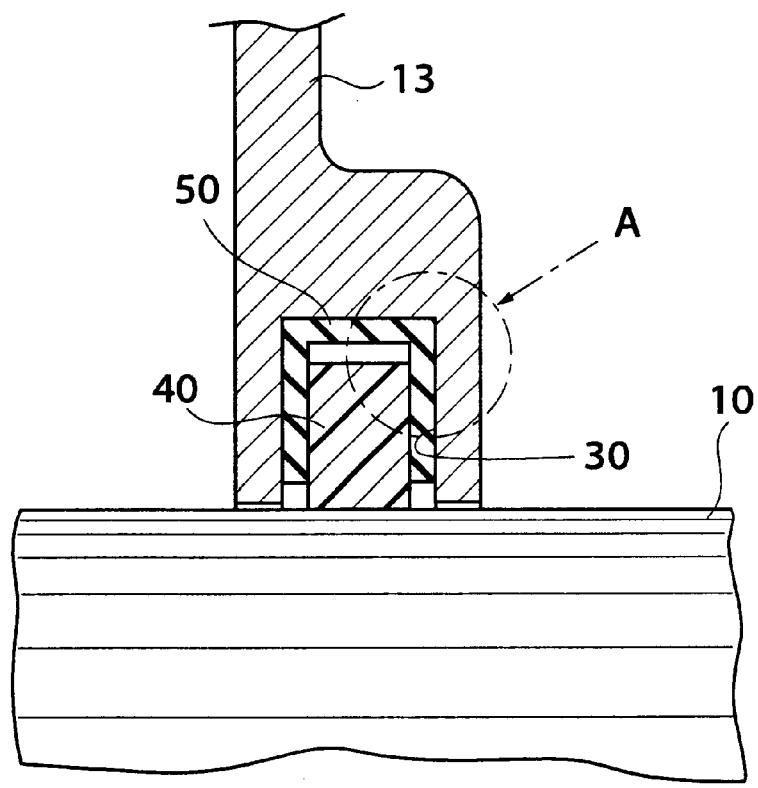
FIG. 3A is a fragmentary axial sectional view showing the construction of a shaft seal device according to a third embodiment of the invention.
Figure 3B:
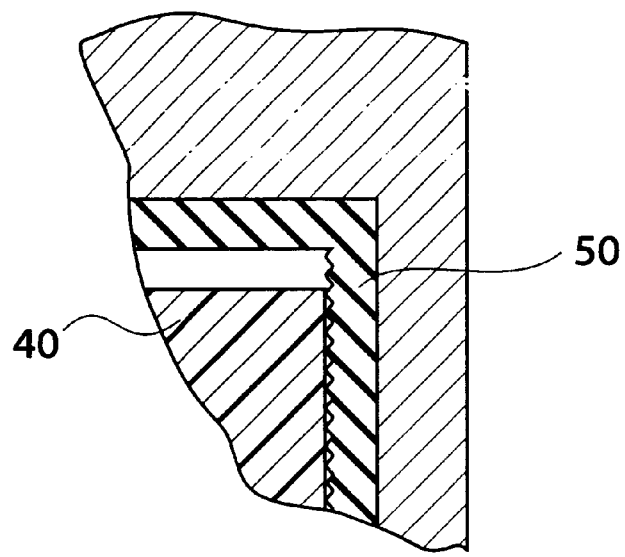
FIG. 3B is a fragmentary enlarged sectional view showing a portion of FIG. 3A on an enlarged scale.

A third embodiment of the present invention will now be described with reference to FIGS. 3A and 3B. FIG. 3A shows an axial section of a shaft seal device according to the third embodiment, and FIG. 3B is an enlarged sectional view of a portion encircled by a dashed line in FIG. 3A.

The third embodiment is distinguished from the second embodiment in that the opposite inner end surfaces of the covering member 50 are roughened into satin finished surfaces, for example. The surface roughness of the satin finished surfaces is in a range of approximately 10 S to approximately 500 S.

Next, the operation of the present embodiment will be described. In the second embodiment described above, the lubricant-bearing polymer member 40 has at least one end surface thereof disposed in sliding contact with at least one associated inner end surface of the covering member 50. However, if the inner end surfaces of the covering member 50 are very smooth and at the same time a thin film of lubricant is formed between the sliding surfaces of the polymer member 40 and the covering member 50, there can occur a phenomenon that the inner end surface(s) of the covering member 50 and the associated end surface(s) of the polymer member 40 become stuck together, whereby the covering member 50 receives torque from the rotating polymer member 40 and accordingly can easily rotate in the sealing channel 30 at the axial end of the housing 13, which results in that the covering member 50 and the inner walls of the sealing channel 30 rub each other and hence the covering member 50 wears down. To prevent the above phenomenon, in the third embodiment, the inner end surfaces of the covering member 50 are roughened into satin finished surfaces, for example. The roughened surfaces of the covering member 50 can prevent the inner end surface(s) of the covering member 50 and the associated end surface(s) of the polymer member 40 from becoming stuck together and hence prevent the covering member 50 from rotating.

Figure 4:
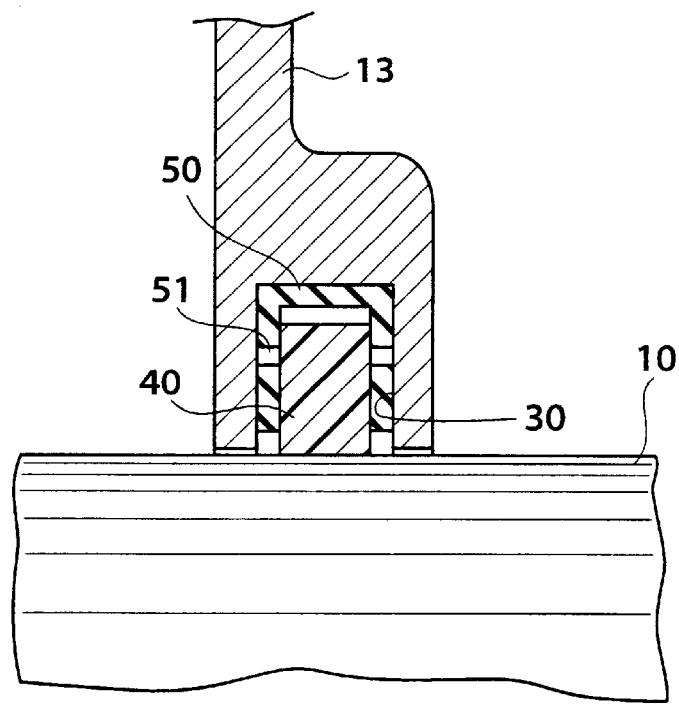
FIG. 4 is a fragmentary axial sectional view showing the construction of a shaft seal device according to a fourth embodiment of the invention.

A fourth embodiment of the present invention will be described with reference to FIG. 4 showing the construction of a shaft seal device according to the fourth embodiment.

The fourth embodiment is distinguished from the second embodiment in that each of the end walls of the covering member 50 is formed with at least one through hole 51 which extends through the end wall in the longitudinal direction of the rotary shaft 10. The suitable diameter of the through hole 51 may range from 0.1 mm to 10 mm. The number of the through hole 51 may preferably be 8 or more for each of the end walls, and a plurality of the through holes 51 may also preferably be circumferentially arranged at equal intervals.

Next, the operation of the fourth embodiment will be described. In the second embodiment described above, the end surface(s) of the polymer member 40 slides (slide) against the inner end surface(s) of the covering member 50. As mentioned above, if the inner end surfaces of the covering member 50 are very smooth and at the same time a thin film of lubricant is formed between the sliding surfaces of the polymer member 40 and the covering member 50, there can occur a phenomenon that the inner end surface(s) of the covering member 50 and the associated end surface(s) of the polymer member 40 become stuck together, whereby the covering member 50 receives torque from the rotating polymer member 40 and accordingly can easily rotate in the sealing channel 30 at the axial end of the housing 13, which results in that the covering member 50 and the inner walls of the sealing channel 30 rub each other and hence the covering member 50 wears down. To prevent the above phenomenon, in the fourth embodiment, one or more longitudinally extending through holes 51 are formed in each of the end walls of the covering member 50. Therefore, air passes through the holes 51, which cuts off the thin film of lubricant formed on the polymer member 40 at portions thereof corresponding to the locations of the through holes 51, so that the end surfaces of the two members 40, 50 are not stuck together at the cut-off portions of the thin film, thus preventing the covering,member 50 from rotating.

Figure 5:
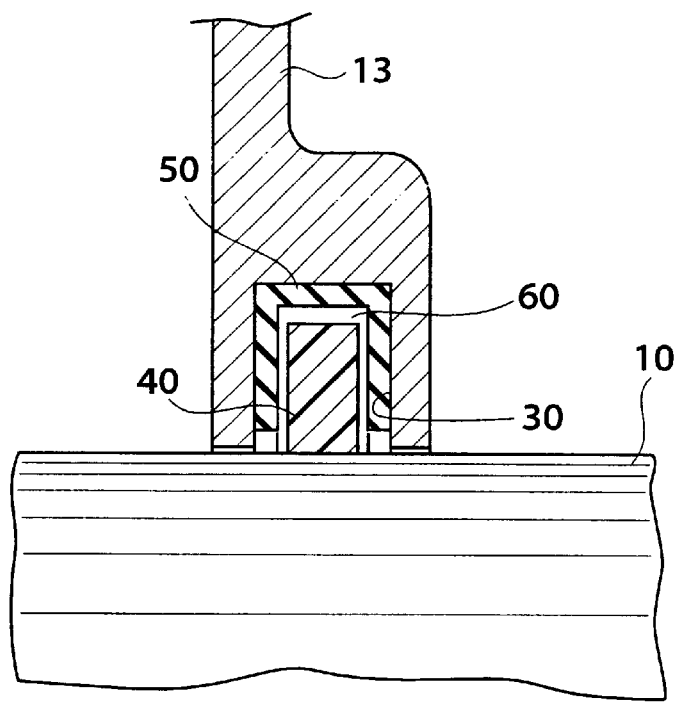
FIG. 5 is a fragmentary axial sectional view showing the construction of a shaft seal device according to a fifth embodiment of the invention.

A fifth embodiment of the present invention will be described with reference to FIG. 5 showing an axial section of a shaft seal device according to the fifth embodiment.

The fifth embodiment is distinguished from the second embodiment in that the lubricant-bearing polymer member 40 has a thickness set to a value smaller than the distance between the opposite inner end surfaces of the covering member 50 such that the end surfaces of the polymer member 40 and the respective associated inner end surfaces of the covering member 50 are spaced from each other, providing a gap 60 therebetween. The gap 60 extends along one end surface of the polymer member 40, along the outer peripheral surface thereof, and then along the other end surface thereof, thus presenting a form of a labyrinth. The labyrinth gap 60 is filled with the lubricant exuding from the polymer member 40. The gap 60 has a size from approximately 0.1 mm to approximately 1 mm.

Next, the operation of the fifth embodiment will be described. In the initial stage of rotation of the rotary shaft 10, the lubricant-bearing polymer member 40 is stationary or rotating relative to the covering member 50. On this occasion, however, the labyrinth gap 60 is maintained, so that alien substances such as dust and water droplets will not enter the bearing unit via the outer peripheral portion of the polymer member 40. As the rotation of the rotary shaft 10 continues and accordingly the polymer member 40 becomes reduced in size with exudation of the lubrication therefrom, the polymer member 40 rotates together with the rotary shaft 10. On this occasion, as is the case with the initial stage of rotation of the rotary shaft, the labyrinth gap 60 is maintained and filled with the lubricant, providing a higher sealing performance than in the initial stage of rotation of the rotary shaft 10. When the polymer member 40 rotates together with the rotary shaft 10, the polymer member 40 does not slide against the other part or the covering member 50, and therefore the torque of the rotary shaft 10 can be reduced as compared with the shaft seal device according to the second embodiment.

Figure 6A:
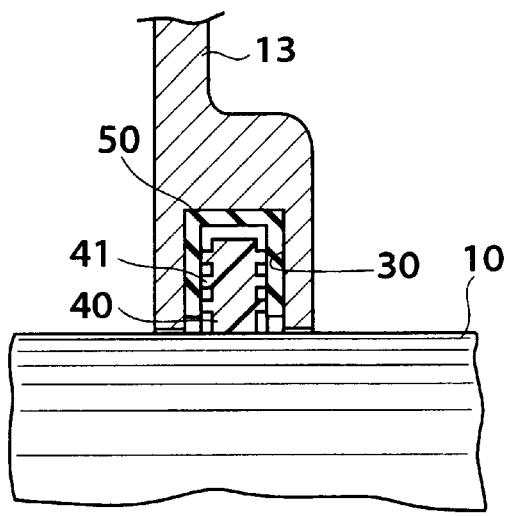
FIG. 6A is a fragmentary axial sectional view showing the construction of a shaft seal device according to a sixth embodiment of the invention.

A sixth embodiment of the present invention will be described with reference to FIG. 6A showing an axial section of a shaft seal device according to the sixth embodiment.

The sixth embodiment is distinguished from the second embodiment in that a plurality of protuberances 41 are formed on the opposite end surfaces of the lubricant-bearing polymer member 40 in a fashion circumferentially extending in concentricity with the inner peripheral surface of the polymer member 40. The tip of each protuberance 41 is flat and disposed in contact with the associated inner end surface of the covering member 50. In the illustrated embodiment of FIG. 6A, three protuberances 41 are formed on each end surface of the polymer member 40, and totally sixth protuberances 41 are formed on the both end surfaces of the polymer member 40. When the polymer member 40 rotates, these protuberances 41 and the respective associated inner end surfaces of the covering member 50 slide against each other.

Next, the operation of the sixth embodiment will be described. In the initial stage of rotation of the rotary shaft 10, the flat tip surface of each protuberance 41 on the polymer member 40 and the associated inner end surface of the covering member 50 are in stationary close contact with each other or slide against each other. As the rotation of the rotary shaft 10 continues and accordingly the polymer member 40 becomes reduced in size with exudation of the lubricant therefrom, the polymer member 40 becomes tightly fitted on the rotary shaft 10, so that the protuberances 41 and their respective associated inner end surfaces of the covering member 50 slide against each other. Considering the path of entry of dust, water droplets, or the like into the bearing unit, a plurality of sets of the tip surfaces of the protuberances 41 in sliding contact with the inner end surfaces of the covering member and spaces between the protuberances 41 and the covering member 50 are present, that is, the spaces between the protuberances 41 and the covering member 50 present gaps in the form of a labyrinth. Therefore, in addition to the effects of the second embodiment, the labyrinth effect is additionally provided by the protuberances 41, to thereby further enhance the sealing performance.

Figure 6B:
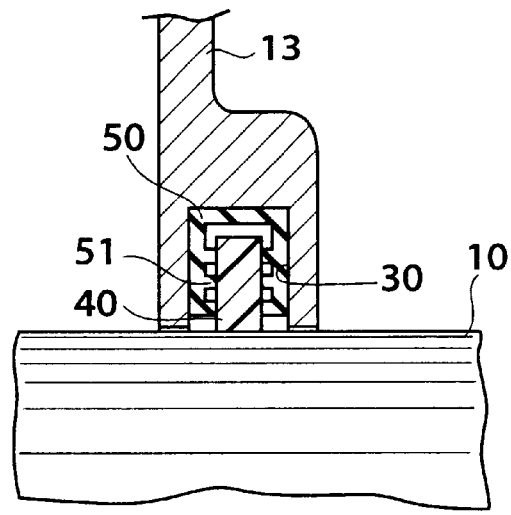
FIG. 6B is a similar view to FIG. 6A showing the construction of a variation of the sixth embodiment.

FIG. 6B shows a variation of the sixth embodiment, in which, in place of the protuberances 41 provided on the opposite end surfaces of the lubricant-bearing polymer member 40, similar protuberances 51 are formed on the opposite inner end surfaces of the covering member 50.

Figure 6C:
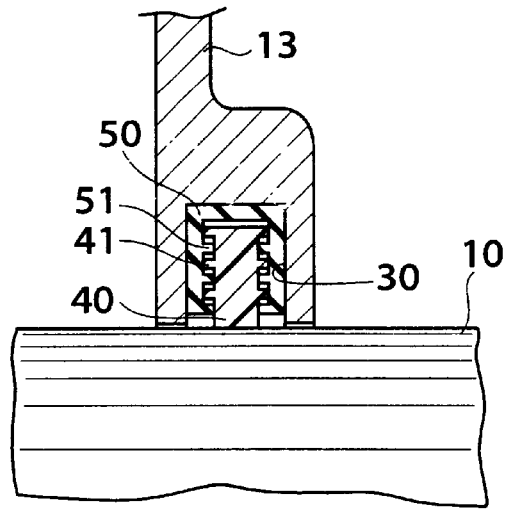
FIG. 6C is a fragmentary axial sectional view showing the construction of another variation of the sixth embodiment.

FIG. 6C shows another variation of the sixth embodiment, which employs a combination of the protuberances 41 in FIG. 6A and the protuberances 51 in FIG. 6B.

Also these variations can provide substantially the same effects as mentioned above.

Figure 7A:
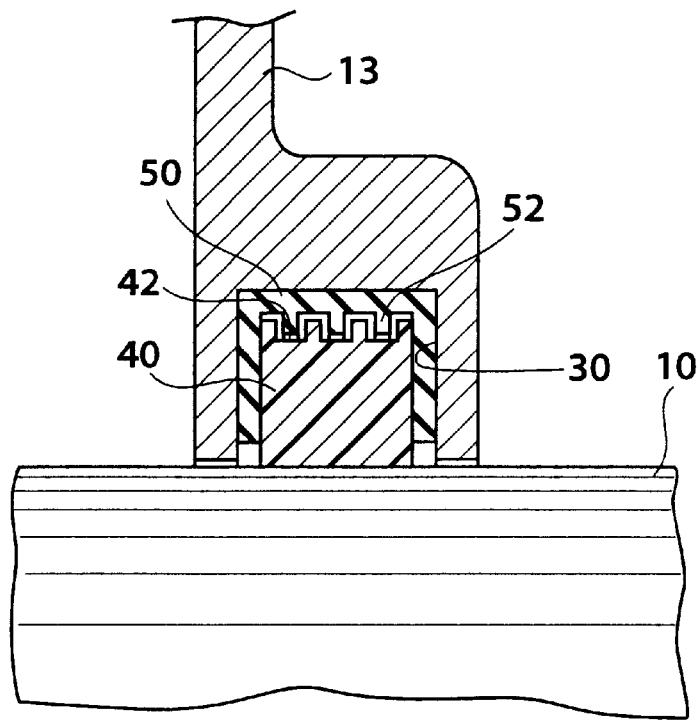
FIG. 7A is a fragmentary axial sectional view showing the construction of a shaft seal device according to a seventh embodiment of the invention.

A seventh embodiment of the present invention will be described with reference to FIG. 7A showing an axial section of a shaft seal device according to the seventh embodiment.

The seventh embodiment is distinguished from the second embodiment in that a plurality of peripheral grooves 42 are formed in the outer peripheral surface of the lubricant-bearing polymer member 40, and a plurality of peripheral protuberances 52 are formed on the inner peripheral surface of the covering member 50 at locations corresponding respectively to the peripheral grooves 42. In the illustrated embodiment of FIG. 7A, three peripheral grooves 42 and three peripheral protuberances 52 are provided. Each peripheral protuberance 52 is inserted in an associated peripheral groove 42 in a fashion being spaced from the latter with a constant clearance therebetween. The clearance ranges from approximately 0.1 mm to approximately 1 mm.

Next, the operation of the seventh embodiment will be described. Irrespective of whether the lubricant-bearing polymer member 40 is rotating or stationary, the path of entry of alien substances such as dust and water droplets into the bearing unit includes gaps in the form of a labyrinth consisting of alternate recesses and projections, provided at the outer periphery of the polymer member 40. Therefore, compared with the construction of the second embodiment, the gaps in the form of a labyrinth at the outer periphery of the polymer member 40 are added, to thereby achieve a stronger sealing effect.

Figure 7B:
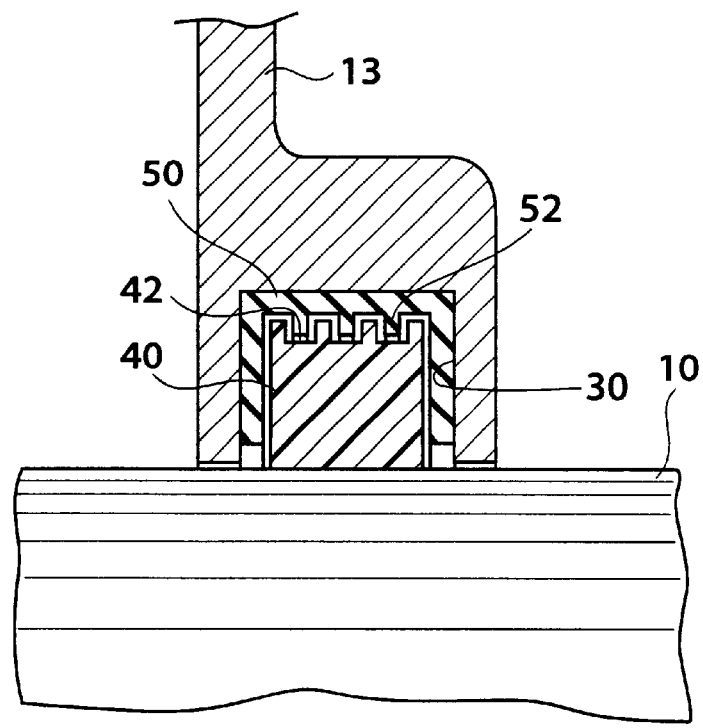
FIG. 7B is a similar view to FIG. 7A showing the construction of a variation of the seventh embodiment.

FIG. 7B shows a variation of the seventh embodiment. While according to the seventh embodiment at least one end surface of the polymer member 40 may be in contact with the associated inner end surface of the covering member 50, the opposite end surfaces of the polymer member 40 may be slightly spaced from the opposite inner end surfaces of the covering member 50 with a certain clearance, as shown in in FIG. 7B, in addition to the provision of the gaps in the form of a labyrinth. The clearance ranges from approximately 0.1 mm to approximately 1 mm.

Figure 8A:
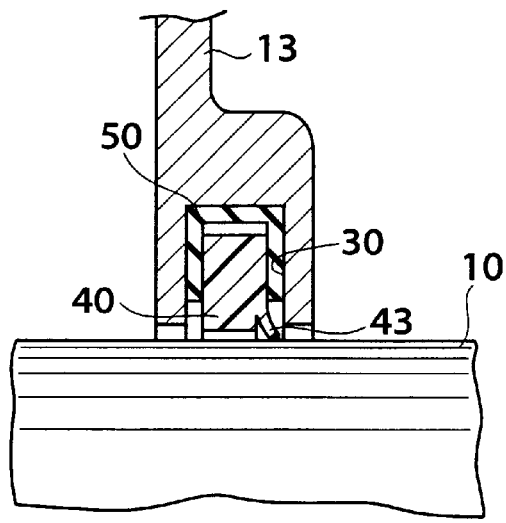
FIG. 8A is a fragmentary axial sectional view showing the construction of a shaft seal device according to an eighth embodiment of the invention.
Figure 8B:
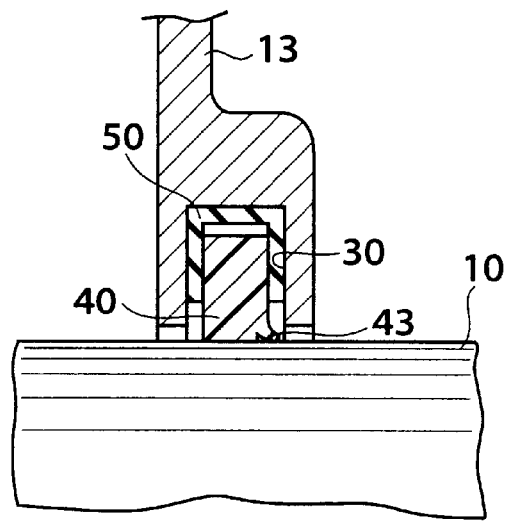
FIG. 8B is a similar view to FIG. 8A, showing the shaft seal device with a lubricant-bearing polymer member 40 reduced in size.

An eighth embodiment of the present invention will be described with reference to FIG. 8A showing an axial section of a shaft seal device according to the eighth embodiment, and FIG. 8B showing a state in which the lubricant-bearing polymer member 40 is reduced in size.

The eighth embodiment is distinguished from the second embodiment in that a lip 43 is provided at a portion of the inner periphery of the lubricant-bearing polymer member 40, for sliding contact with the rotary shaft 10. The rest portion of the inner periphery of the polymer member 40 other than the portion provided with the lip 43 defines a hollow cylindrical shape concentric with the lip 43 and has a diameter larger than the outside diameter of the rotary shaft 10.

Next, the operation of the eighth embodiment will be described. In the initial stage of rotation of the rotary shaft 10, the lip 43 and the rotary shaft 10 slide against each other, exhibiting a sealing function by the lip 43. Since the lubricant exudes from the lip 43 as well, the lip 43 will not be worn down by its sliding against the rotary shaft 10. As the rotation of the rotary shaft 10 continues and the lubricant exudes from the polymer member 40, the inside diameter of the polymer member 40 becomes reduced and accordingly the diameter of the hollow cylindrical portion at the inner periphery of the polymer member 40 becomes smaller than the outside diameter of the rotary shaft 10 so that the polymer member 40 becomes tightly fitted on the rotary shaft 10, as shown in FIG. 8B, whereby the end surfaces of the polymer member 40 and the inner end surfaces of the covering member 50 slide against each other, thus serving as sealing surfaces. With the arrangement of the eighth embodiment, in the initial stage of rotation of the rotary shaft 10, the lip 43 exhibits a sealing function, and therefore, compared with the second embodiment, the sealing performance is enhanced. Since the hollow cylindrical portion at the inner periphery of the polymer member 40, which becomes tightly fitted on the rotary shaft 10, has a hollow cylindrical shape, the polymer member 40 can be prevented from being fitted aslant on the rotary shaft 10 and hence stuck thereto when the former become tightly fitted on the latter.

Figure 8C:
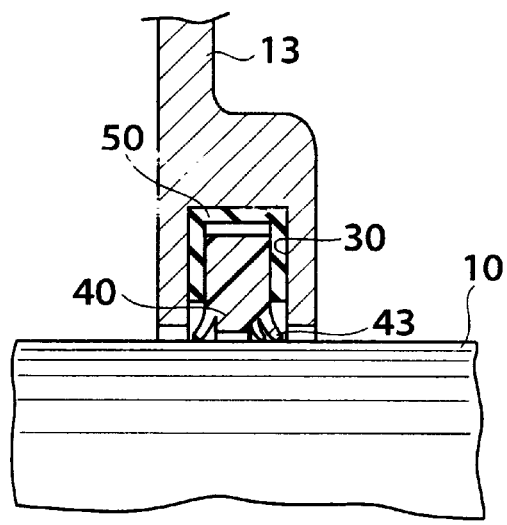
FIG. 8C is a similar view to FIG. 8A showing the construction of a variation of the eighth embodiment.

FIG. 8C shows a variation of the eighth embodiment, in which a plurality of lips 43 are provided, to thereby further enhance the sealing performance.

Figure 9A:
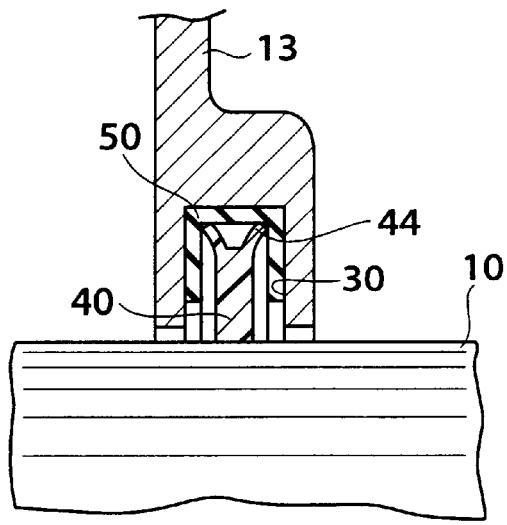
FIG. 9A is a fragmentary axial sectional view showing the construction of a shaft seal device according to a ninth embodiment of the invention.

A ninth embodiment of the present invention will be described with reference to FIG. 9A showing an axial section of a shaft seal device according to the ninth embodiment.

The ninth embodiment is distinguished from the second embodiment in that a pair of lips 44 are formed in a circumferentially extending fashion at the outer periphery of the lubricant-bearing polymer member 40 and disposed in elastic contact with the inner peripheral surface of the covering member 50. The lips 44 each project from an associated end surface of the polymer member in the longitudinal direction of the rotary shaft 10. Therefore, the opposite end surfaces of the polymer member 40 are out of contact with the opposite inner end surfaces of the covering member 50. Only one lip 44 or more than two lips 44 may be provided, as is distinct from the example of FIG. 9A.

Next, the operation of the ninth embodiment will be described. In the initial stage of rotation of the rotary shaft 10, the rotary shaft 10 rotates in sliding contact with the inner peripheral surface of the lubricant-bearing polymer member 40 to thereby form a sealing surface there. As the rotation of the rotary shaft 10 continues and the lubricant exudes from the polymer member 40 so that the inside diameter of the polymer member 40 becomes smaller than the outside diameter of the rotary shaft 10, the polymer member 40 rotates together with the rotary shaft 10. Then, the lips 44, which is elastically deflectable, at the outer periphery of the polymer member 40 and the inner peripheral surface of the covering member 50 slide against each other to thereby form a sealing surface there. The outside diameter of the polymer member 40 is also reduced as the rotation of the rotary shaft 10 continues. However, the amount of deflection of the lips 44 is set to a sufficient amount for the amount of reduction in the outside diameter. Therefore, there is no possibility that the lips 44 become separated from the inner peripheral surface of the covering member 50 to spoil the sealing performance.

Figure 9B:
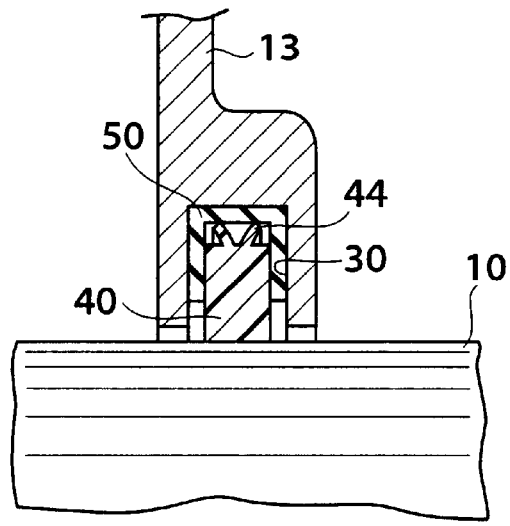
FIG. 9B is a similar view to FIG. 9A showing the construction of a variation of the ninth embodiment.

FIG. 9B shows a variation of the ninth embodiment. The tips of the lips 44 need not project from the respective associated end surfaces of the polymer member 40 in the longitudinal direction of the rotary shaft 10. As shown in FIG. 9B, the lips 44 are formed on the outer periphery of the polymer member 40 in such a fashion that they entirely lie in the range of the thickness of the polymer member 40. Therefore, the end surfaces of the polymer member 40 and the inner end surfaces of the covering member 50 can be brought into contact with each other, providing a sealing surface between the end surfaces of the two members. That is, compared with the construction of the second embodiment, additional sealing by the lips 44 is provided at the outer periphery of the polymer member 40.

Figure 9C:
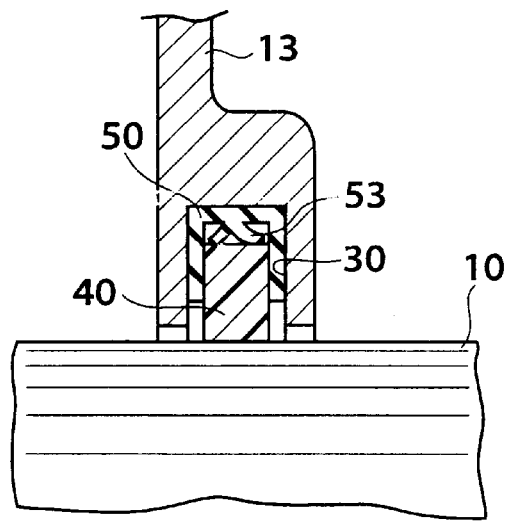
FIG. 9C is a similar view to FIG. 9A showing the construction of another variation of the ninth embodiment.

FIG. 9C shows another variation of the ninth embodiment, in which, in place of the lips 44 formed at the outer periphery of the lubricant-bearing polymer member 40, lips 53 are formed on the inner periphery of the covering member 50. In this case, the outer peripheral surface of the polymer member 40 is cylindrically shaped. Even with this arrangement in which lips are formed on the covering member 50 side, substantially the same sealing performance can be obtained as that obtained with the arrangement of FIG. 9A.

Figure 10A:
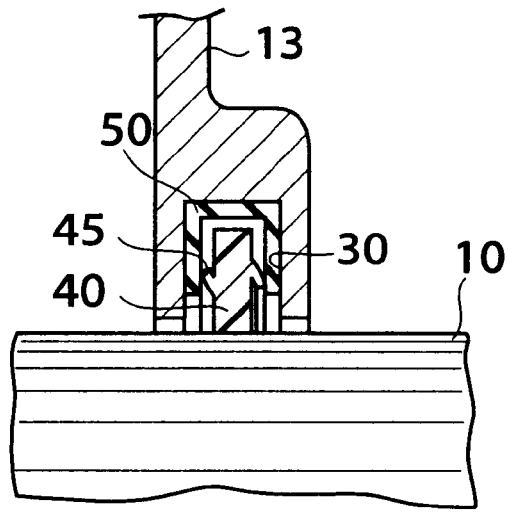
FIG. 10A is a fragmentary axial sectional view showing the construction of a shaft seal device according to a tenth embodiment of the invention.

A tenth embodiment of the present invention will be described with reference to FIG. 10A showing an axial section of a shaft seal device according to the tenth embodiment.

The tenth embodiment is distinguished from the second embodiment in that lips 45 are formed on the opposite end surfaces of the lubricant-bearing polymer member 40, which circumferentially extend in concentricity with the inner peripheral surface of the polymer member 40 and disposed in elastic contact with the respective associated inner end surfaces of the covering member 50. In the illustrated embodiment, a pair of lips 45 are formed on the opposite end surfaces of the polymer member, one lip 45 being oriented radially outward, and the other being oriented radially inward.

Figure 10B:
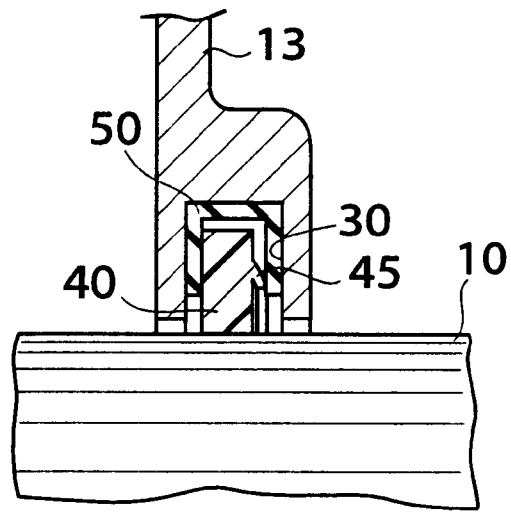
FIG. 10B is a similar view to FIG. 9A showing the construction of a variation of the tenth embodiment.

FIG. 10B shows a variation of the ninth embodiment, in which a lip 44 is formed only on one end surface of the polymer member 40. In this case, the other end surface of the polymer member 40 is in direct contact with the associated inner end surface of the covering member 50. It suffices to provide at least one lip 45. Also, a plurality of lips 44 may be formed on one or each end surface of the polymer member 40.

Next, the operation of the tenth embodiment and the variation thereof will be described. In the initial stage of rotation of the rotary shaft 10, the rotary shaft 10 rotates in sliding contact with the inner peripheral surface of the polymer member 40 to form a sealing surface there. As the rotation of the rotary shaft 10 proceeds and the lubricant exudes from the polymer member 40 so that the inside diameter of the polymer member 40 becomes smaller than the outside diameter of the rotary shaft 10 and hence the former becomes tightly fitted on the latter, the polymer member 40 rotates together with the rotary shaft 10. Then, the lips 45 at the end surfaces of the polymer member 40 and the inner end surfaces of the covering member 50 slide against each other to form sealing surfaces therebetween.

The lubricant exudes from the lips 45, to thereby prevent the lips 45 from being worn down due to sliding friction to form gaps between the lips 45 and the inner end surfaces of the covering member 50. According to the tenth embodiment and the variation, compared with the second embodiment, sealing is effected by the lips 45, to thereby further enhance the sealing performance.

Figure 10C:
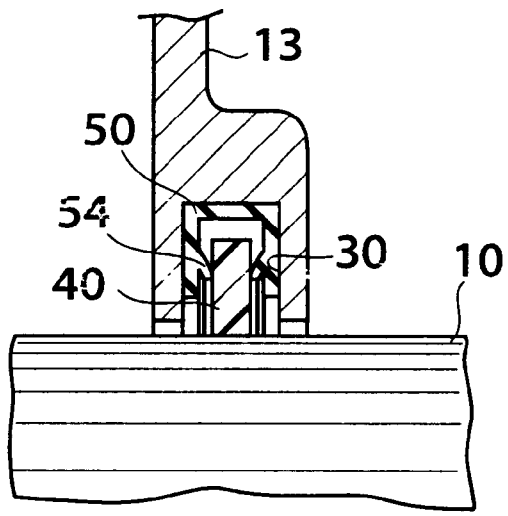
FIG. 10C is a similar view to FIG. 9A showing the construction of another variation of the tenth embodiment.

FIG. 10C shows another variation of the tenth embodiment, in which, in place of the lips 45 formed at the end surfaces of the polymer member 40, lips 54 may be formed on the opposite inner end surfaces of the covering member 50. In this case, each end surface of the polymer member 40 is a flat surface. Even if the lips are thus formed on the covering member 50 side, substantially the same sealing effects can be achieved.

Figure 10D:
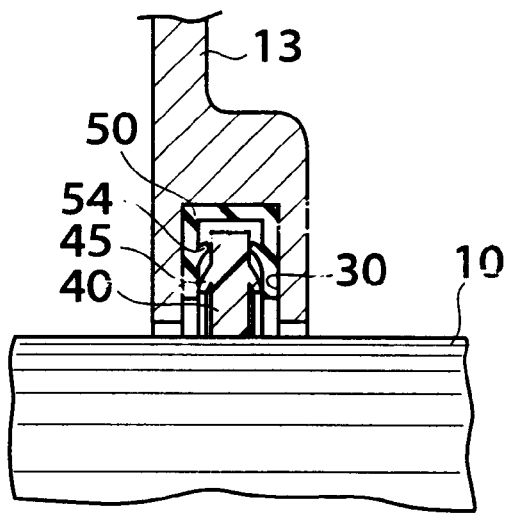
FIG. 10D is a similar view to FIG. 9A showing the construction of a further variation of the tenth embodiment.

FIG. 10D shows a further variation of the tenth embodiment, in which both lips 45 and 54 are provided at the end surfaces of the polymer member 40 and the inner end surfaces of the covering member 50, to thereby further enhance the sealing performance.

Figure 11:
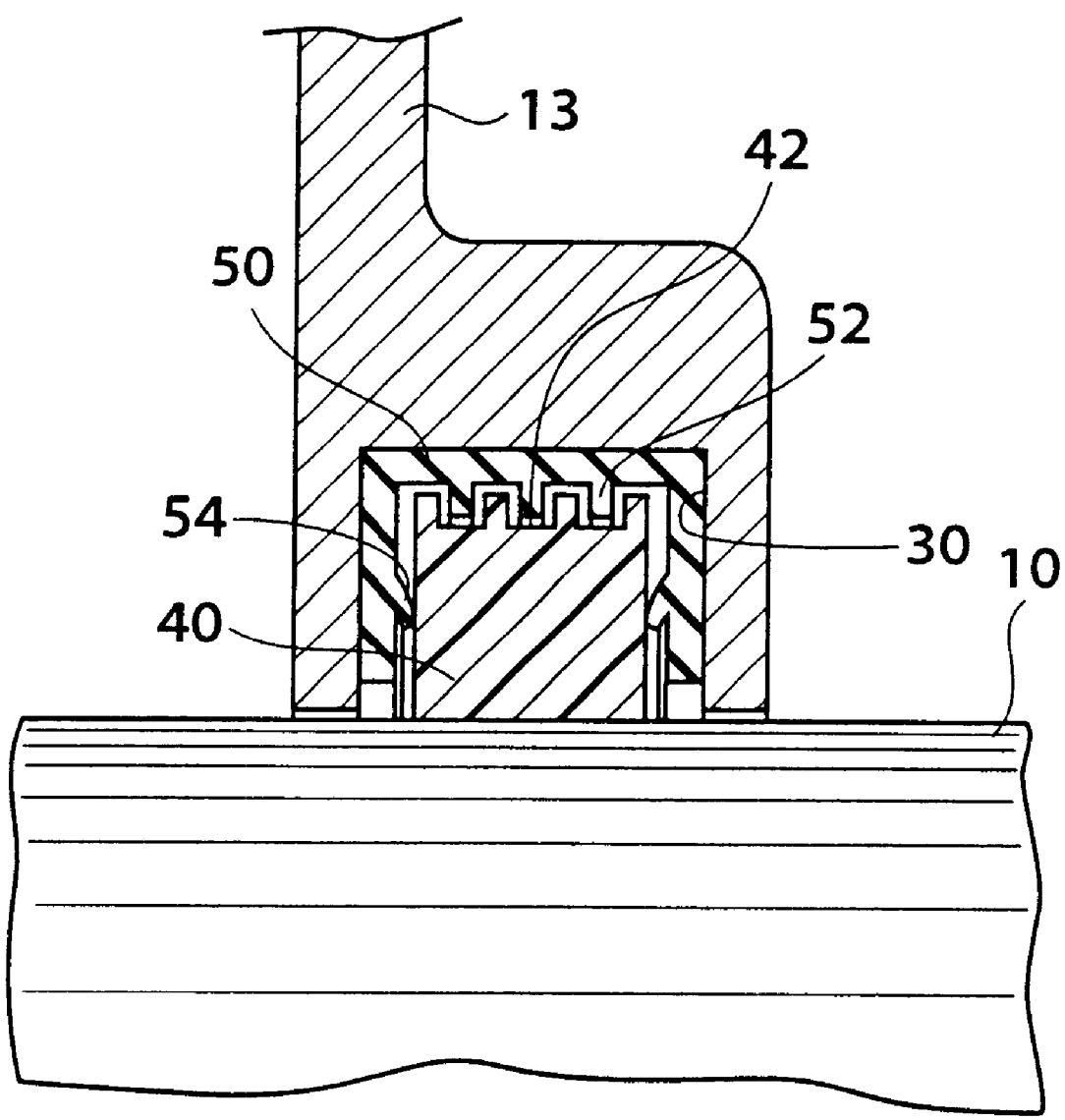
FIG. 11 is a fragmentary axial sectional view showing the construction of a shaft seal device according to an eleventh embodiment of the invention.

An eleventh embodiment of the present invention will be described with reference to FIG. 11 showing an axial section of a shaft seal device according to the eleventh embodiment.

The eleventh embodiment is a combination of the seventh embodiment and the tenth embodiment described above.

According to the present embodiment, similarly to the seventh embodiment, peripheral grooves 42 are formed in the outer peripheral surface of the lubricant-bearing polymer member 40, and peripheral protuberances 52 are formed on the inner peripheral surface of the covering member 50 at locations corresponding to the respective peripheral grooves 42 and inserted in the latter with a constant clearance of approximately 0.1 mm to approximately 1 mm therebetween. Further, similarly to the tenth embodiment, lips 54 are formed on the inner end surfaces of the covering member in concentricity with the inner peripheral surface of the covering member 50 and disposed in elastic contact with the respective end surfaces of the polymer member 40. Alternatively, a lip similar to the lips 54 may be formed only on one inner end surface of the covering member 50, or one or more similar lips may be formed on one or both end surfaces of the polymer member 40, or on both of the polymer member 40 and the covering member 50.

The operation of the eleventh embodiment is a combination of the operations of the seventh and tenth embodiments, providing both of the effects of the two embodiments as described above. That is, the path of entry of alien substances such as dust and water droplets into the bearing unit includes a gap in the form of a labyrinth consisting of alternate recesses and projections provided at the outer periphery of the polymer member 40 irrespective of whether the polymer member 40 is rotating or stationary. Therefore, alien substances cannot easily enter the interior of the bearing unit. Besides, the lips formed on the inner end surfaces of the covering member 50 elastically contact the end surfaces of the polymer member 40, which renders it more difficult for alien substances to enter the bearing unit. As a result, the sealing performance can be further enhanced.

Figure 12A:
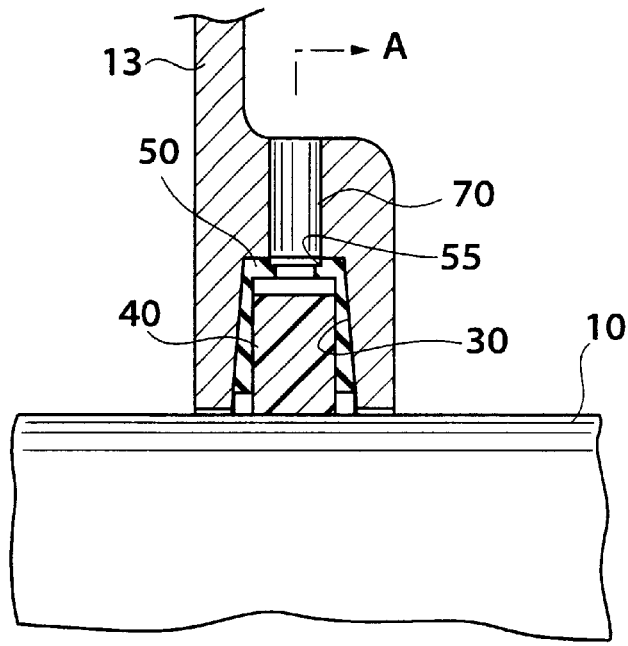
FIG. 12A is a fragmentary axial sectional view showing the construction of a shaft seal device according to a twelfth embodiment of the invention.
Figure 12B:
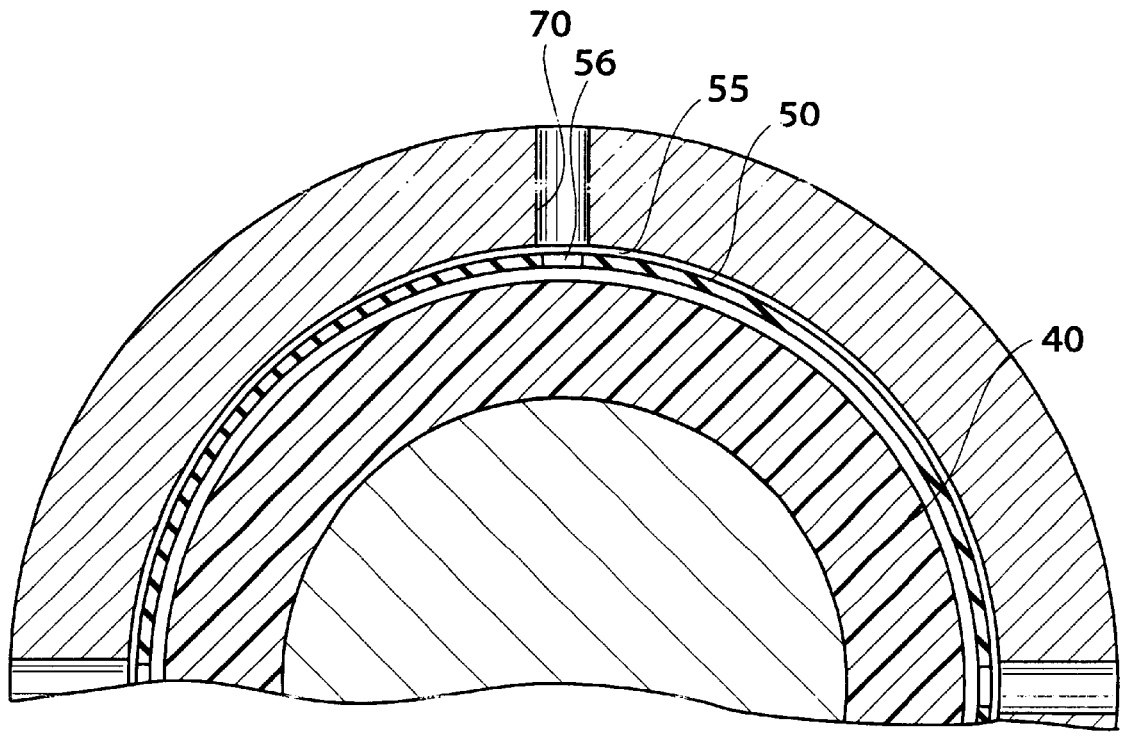
FIG. 12B is a sectional view taken along line A—A in FIG. 12A.
Figure 13:
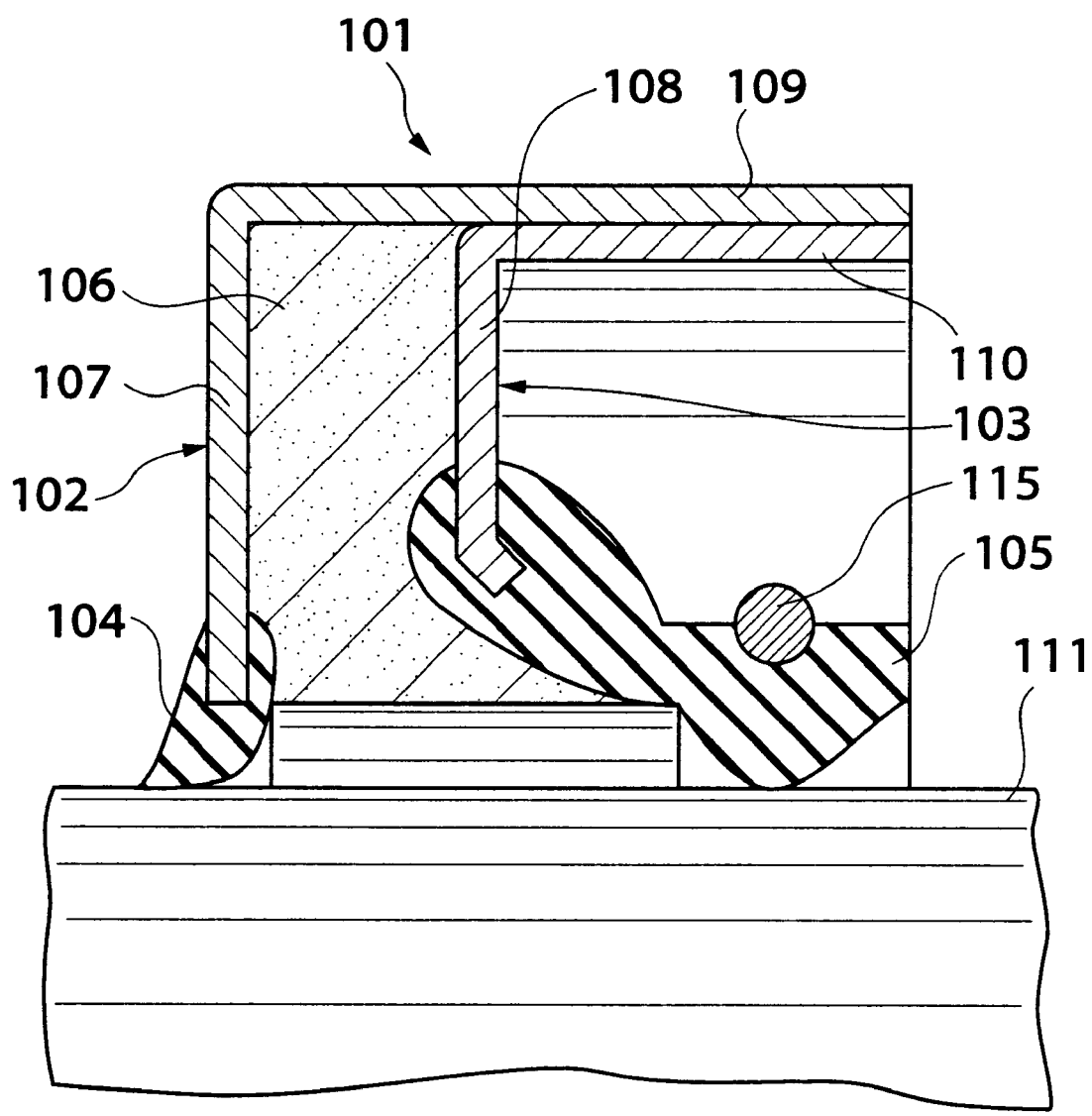
FIG. 13 is a fragmentary axial sectional view showing the construction of a conventional shaft seal device.

A twelfth embodiment of the present invention will be described with reference to FIG. 12A showing an axial section of a shaft seal device according to the twelfth embodiment and FIG. 12B showing a section taken along line A—A in FIG. 12A.

The twelfth embodiment is distinguished from the second embodiment in that a circumferentially extending outer peripheral groove 55 is formed in the outer peripheral surface of the covering member 50. The covering member 50 is further formed therein with four lubricant supply holes 56 each extending in the peripheral wall of the covering member 50 from the outer peripheral groove 55 to the inner peripheral surface of the covering member 50. The through holes 56 are circumferentially arranged at equal intervals. By so arranging the holes 56, irrespective of the angular position in which the covering member 50 is placed about a horizontal line, at least one of the holes 56 is necessarily positioned above the horizontal line and opens upward. A lubricant supply port 70 is formed in the housing 13 in a fashion upwardly extending from an uppermost portion of the outer peripheral groove 56 formed in the covering member 50 which is fitted in the sealing channel 30 at the axial end of the housing 13. Although the four lubricant supply holes 56 are circumferentially arranged at equal intervals, it is more desirable that more than four holes 56 are provided. Lubricant may be directly poured into the lubricant supply port 70, or an oiler may be connected to the port 70.

Next, the operation of the twelfth embodiment will be described. Lubricant poured into the lubricant supply port 70 is guided to the outer periphery of the covering member 50. Then, the lubricant is guided along the outer peripheral groove 55 of the covering member 50 to reach the first upwardly directed lubricant supply hole 56. The lubricant passes the same hole 56 to move from the outer peripheral surface of the covering member 50 to the inner peripheral surface of the same, and finally permeates into the polymer member 40. Thus, lubricant is supplied to the polymer member 40 and stored therein to supplement lubricant exuding from the polymer member 40 for lubrication. With the arrangement of the twelfth embodiment, since lubricant is supplied to the lubricant-bearing polymer member for supplement of exuded lubricant, though the polymer member 40 inherently can operate for a long time without supply of lubricant, the effective life of the polymer member 40 can be further prolonged.

What is claimed is:

1. A shaft seal device for a bearing unit having a bearing fitted on a rotary shaft, and a housing accommodating the rotary shaft extending therethrough, the housing having opposite ends, comprising:

an annular sealing channel formed in at least one of the opposite ends of the housing, the annular sealing channel having inner end surfaces;

an annular covering member formed of an elastic material and having an inner peripheral channel formed therein, the annular covering member being fitted in the annular sealing channel in an elastically compressed fashion; and an annular lubricant-bearing polymer member accommodated in the inner peripheral channel of the annular covering member and fitted on the rotary shaft, the lubricant-bearing polymer member having opposite end surfaces, and an outer peripheral portion, wherein the lubricant-bearing polymer member has an inside diameter substantially equal to an outer diameter of the rotary shaft at an initial stage of rotation of the rotary shaft; and wherein at least part of the opposite end surfaces or the outer peripheral portion of the lubricant-bearing polymer member is disposed substantially in contact with the inner end surfaces of the inner peripheral channel.

2. A shaft seal device as claimed in claim 1, wherein at least one of the opposite lateral wall surfaces of the annular sealing channel is tapered, and the annular covering member has opposite outer end surfaces at least one of which is tapered according to the tapered at least one of the opposite lateral walls of the annular sealing channel.

* * * * *